April 11, 1933. A. MOORHOUSE 1,903,595
MOTOR VEHICLE
Filed Nov. 19, 1925   2 Sheets-Sheet 1

Inventor
Alfred Moorhouse
By William Sibbitt
Attorney

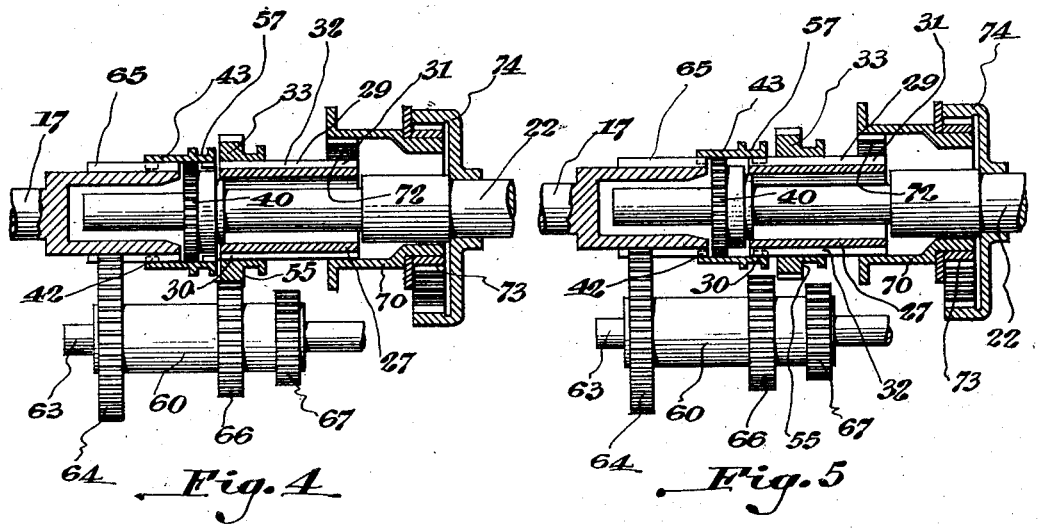
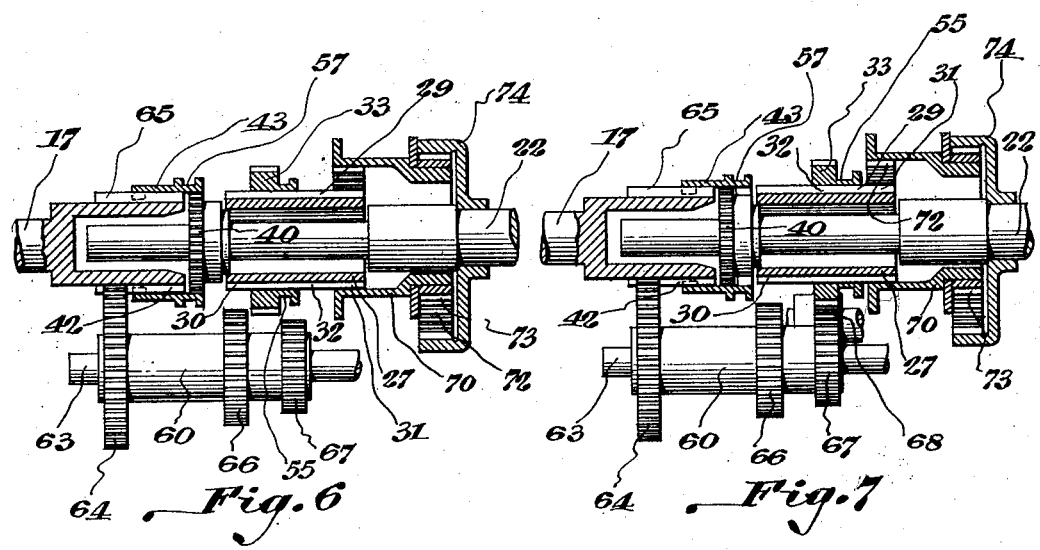

Patented Apr. 11, 1933

1,903,595

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed November 19, 1925. Serial No. 69,973.

This invention relates to motor vehicles and particularly to gearing therefor.

One of the objects of the present invention is to provide an efficient and quiet geared connection between the driving and driven shafts of a gear mechanism.

Another object of the invention is to provide a motor vehicle gearing in which a direct drive may be obtained between the driving and driven shafts and in which the speed reductions are obtained through a duplex internal reduction gearing.

Another object of the invention is to provide a duplex internal reduction gearing in combination with the sliding gears and clutches of a motor vehicle transmission so that all of the speeds of the mechanism, except the direct drive, will pass through the duplex reduction gearing.

Another object of the invention is to provide simple and efficient gearing of the class described for motor vehicles.

Other objects of the invention will appear from the following description taken in connection with the drawings, which form a part of this specification, and in which:

Figs. 4, 5, 6 and 7 are partly diagrammatic views showing the shiftable elements of the gearing in their various positions.

Figure 1:
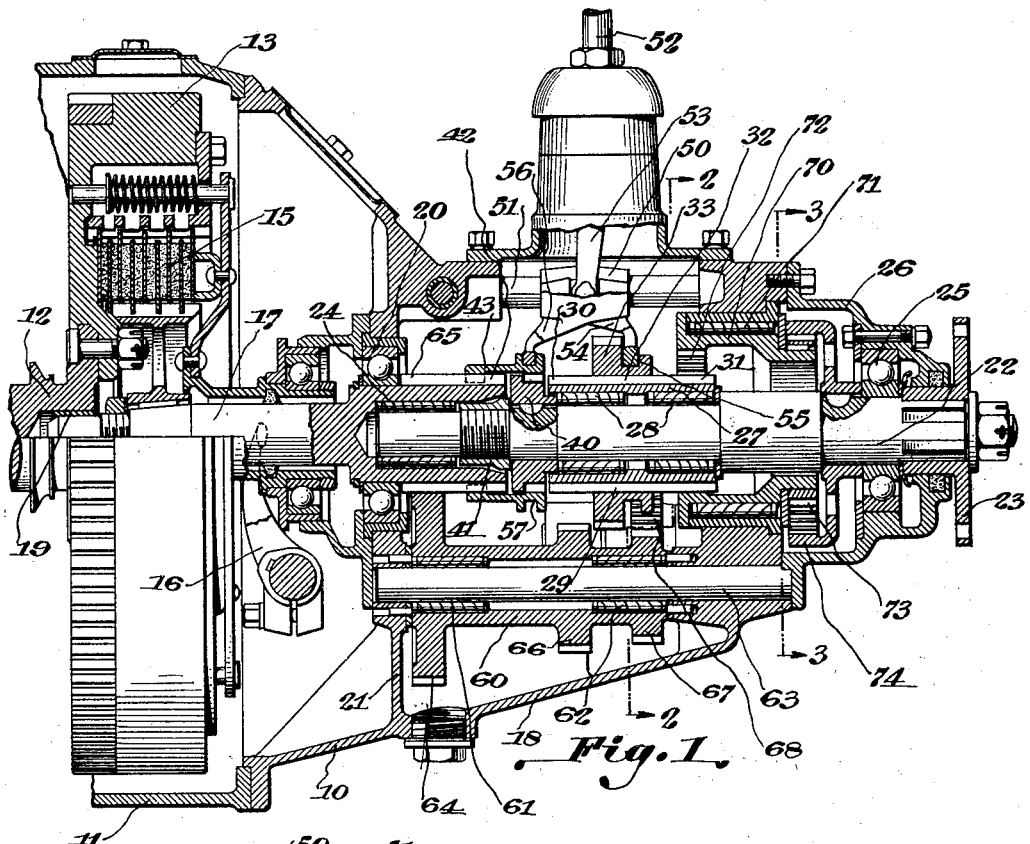
Fig. 1 is a vertical section through a motor vehicle transmission or gear casing embodying the invention.

Referring to the drawings, 10 represents a casing or support for the mechanism of this invention. As shown, the forward end of this casing, indicated at 11, is the rear portion of the crank case of the engine of a motor vehicle and this portion houses the end of the engine crank shaft 12, the fly wheel 13 thereon, and the clutch 15 which is arranged within the fly wheel. The clutch is shiftable by a manually operated device 16, in the usual way, and it drives a shaft 17 which becomes the driving shaft of the gearing which is arranged in the rear portion 18 of the support or casing 10. The forward end of this shaft 17 is supported in a bearing 19 in the crank shaft 12, and its rear portion is supported in a bearing 20 in a partition 21 of the casing 10.

The driven shaft of this gearing mechanism is indicated at 22 and the rear end of this shaft is provided with a keyed on flange member 23 which may form a part of a universal joint or other connection to the propeller shaft of a motor vehicle. The shaft 22 is supported at its forward end in a bearing 24 in the end of the driving shaft 17 and at its reaward end in a bearing 25 in a bracket 26 secured to and forming a part of the casing portion 18. Thus the shaft 22 is aligned with but rotatable independently of the driving shaft 17.

There is a third shaft indicated at 27, which shaft is also aligned with shafts 17 and 22, and this shaft 27 is mounted upon bearings 28 upon an intermediate portion of the driven shaft 22. The shaft 27 is exteriorly formed with gear teeth 29 which are shown to extend throughout the length of the shaft. These teeth at the forward end of the shaft, as at 30, form clutch elements, at their rearward end they form a pinion or gear, as at 31, and intermediate these portions they form splines, as at 32, for a gear element 33 which is mounted to slide thereon.

The driven shaft 22 is provided or formed with a clutch element 40. As shown, this clutch element 40 is a separate piece keyed to the shaft 22 and secured thereon by a threaded nut 41. This clutch element 40 is arranged adjacent the rear end of the shaft 17 and between said shaft and the shaft 27. The shaft 17 is formed with clutch teeth 42 corresponding to the clutch teeth of the element 40 and to the clutch teeth 30 of the shaft 27, and a clutch element 43 is adapted to slide on these parts for making either of two connections between them, viz.; a direct connection between the driving shaft 17 and the driven shaft 22, or a direct connection between the driving shaft 17 and the third shaft 27. There is also a neutral position for the element 43 in which it rotates with the driving shaft 17 but is not connected to either of the other shafts. The positions and functions of this clutch element 43 will be later described when the operation of the gearing is set forth in detail.

Figure 2:
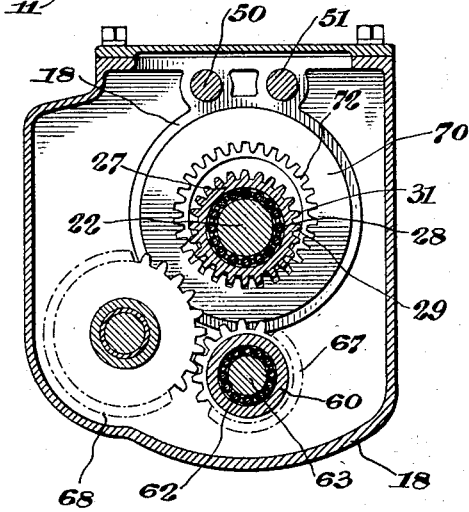
Fig. 2 is a transverse section substantially on the line 2—2 of Fig. 1.

The gear element 33 and the clutch element 43 are adapted to be shifted to their various positions by a conventional gear shifting mechanism such as shown in Figs. 1 and 2. Thus there are two parallel shifter elements 50 and 51 mounted to slide longitudinally in the upper part of the gear casing, and a gear shift rod 52 having its lower end 53 extending between the elements 50, 51 is adapted to connect with either of those shifter elements and move them in their supports. The shifter element 50 has a forked 54 extending into an annular groove 55 in the gear element 33, and the shifter element 51 has a fork 56 extending into a groove 57 in the clutch element 43, so that the longitudinal shifting movements of the elements 50, 51 will correspondingly move the elements 33 and 43. Suitable interlocking connections for the elements 50 and 51 may be provided to prevent the shifting of more than one of these elements at a time from neutral position.

Supported in the casing, preferably below the aligned shafts 17, 22 and 27, is a countershaft 60, its support in the casing being upon bearings 61 and 62 on a rod 63. The forward end of this countershaft 60 has a relatively large gear 64 thereon, and this gear constantly meshes with a gear 65 on the driving shaft 17. The countershaft 60 has a smaller gear 66 which is adapted to mesh with the gear 33 when the latter is in its forward position. Then there is a gear 67 on the countershaft 60, smaller than the other two gears thereon, which gear 67 is adapted to mesh with a reverse gear 68, as shown particularly in Figs. 1 and 2, and the gear 68 is so positioned that it is adapted to mesh with the gear 33 when the latter is in its rearward position.

From the above it will be seen that the driving shaft 17 may drive the shaft 27 either forwardly or rearwardly depending upon the position of the gear element 33. When said gear 33 is in its forward position in mesh with gear 66, the shaft 27 will be driven in the same direction as the shaft 17, but when the gear 33 is in its rearward position in mesh with gear 68, the shaft 27 will be driven in the reverse direction from that of shaft 17.

Figure 3:
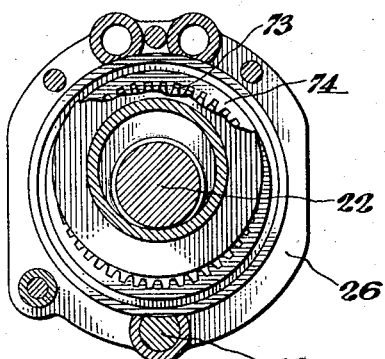
Fig. 3 is a section substantially on the line 3—3 of Fig. 1.

Between the third aligned shaft 27 and the aligned driven shaft 22 is a gear that may be termed duplex internal reduction gearing. This is composed of two pairs of external-internal gears. It is shown herein as comprising a gear element 70 mounted in bearings 71 in the rear end of the casing portion 18 and surrounding the shaft 22. This gear element 70 has an internal gear 72 at its forward end slightly larger and meshing with the gear 31 on the rear end of the shaft 27. This meshing of the gears is shown in both Figs. 1 and 2. The rear end of the gear element 70 has a spur gear 73 formed or keyed thereon and the spur gear meshes with a somewhat larger internal gear 74 which is keyed upon the driven shaft 22. This meshing of the gears 73 and 74 is shown in Figs. 1 and 3. There is no sliding of these gears 31, 72, 73 and 74, but they are always in mesh and rotate with the parts to which they are connected or geared. Since the gear 31 is smaller than the gear 72, and the gear 73 smaller than the gear 74, it is evident there will be a reduction in speed in driving from shaft 27 to shaft 22. As the drive, except when idle, is always from the shaft 27 to the shaft 22, this duplex internal gearing is always a reduction gearing.

The operation of the gearing may be followed through Fig. 1 but it is doubtless best illustrated in Figs. 4, 5, 6 and 7 which indicate respectively first speed, second speed, third or direct speed and reverse speed.

Referring to Fig. 4, the clutch element 43 is in its neutral position so that there is no drive through it from the shaft 17. The gear element 33 is in its forward or first speed position where it meshes with gear 66 on countershaft 60. The drive then is from the driving shaft 17 through constant mesh reduction gearing 65, 64, through countershaft 60, through gears (at slight reduction) 66 and 33 to the third aligned shaft 27, through the first pair of internal reduction gears 31, 72, and then through the second pair of internal reduction gears 73, 74 to the driven shaft 22 where the power is transmitted through the propeller shaft to the wheels of the vehicle.

Referring to Fig. 5, it will be seen that the gear element 33 is in its neutral position and consequently there is no drive through the countershaft 60. The clutch element 43, however, is in its rearward position in which it directly couples the driving shaft 17 to the third shaft 27 so that these two shafts turn together at the same speed. The drive then continues from shaft 27 through the duplex internal reduction gearing 31, 72, 70, 73 and 74, to the driven shaft 22. This second speed is of course at a lesser reduction than the first speed because of the fact that the shaft 27 is driven at the same speed as the shaft 17 instead of at a reduced speed as it is when it comes through the reduction gears of the countershaft.

Referring to Fig. 6, the gear element 33 is in its neutral position as in Fig. 5, but here the clutch element 43 has been moved to its forward position where its teeth mesh with the teeth of clutch element 40 on the driven shaft 22 and consequently the shaft 22 is clutched directly to the shaft 17 and is, therefore, driven at the same speed as that shaft. This is, therefore, a direct drive from shaft 17 to shaft 22 and all of the other gears rotate idly or without the transmission of power through them.

Referring to Fig. 7, the clutch element 43 has been moved to its neutral position whereby it transfers no drive from the shaft 17. The gear element 33 has been moved to its rearward position where it meshes with reverse gear 68 and consequently the drive is from the shaft 17 through constant mesh gears 65, 64, through countershaft 60 and gears 67, 68 and 33 to shaft 27, and thence through the duplex internal reduction gearing 31, 72, 70, 73 and 74 to the driven shaft 22. By reason of the interposition of the reverse gear 68, the shaft 27 is driven in the reverse direction from shaft 17 and consequently the shaft 22 is driven reversely and of course at a greater reduction of speed from the shaft 17.

It will be observed that all of the geared drives are through the duplex reduction gearing, and the second speed is through the duplex reduction gearing only. This is a particularly quiet form of gearing and consequently the second speed is very quiet. By reason of using the reduction in the duplex gearing, the reduction through the countershaft need not be so great and consequently the gears thereon may be made smaller and thereby cheaper and lighter. The duplex gearing in no way interferes with the direct drive from shafts 17 and 22 because when those two shafts are coupled together the duplex gearing operates idly and at only slightly greater speed than the driven shaft.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a supporting casing, a shaft mounted in bearings therein, an aligned shaft supported at one end in a bearing in said casing and at the other end in a bearing in the first said shaft, a shaft of uniform diameter mounted in bearings on said aligned shaft, and means adapted to directly connect the first named shaft with either the aligned shaft or the shaft mounted on the aligned shaft for the transmission of power through either one or the other shafts.

2. In gearing, the combination of a driving shaft, an independently rotatable aligned driven shaft, a third aligned shaft, a countershaft, gearing between the driving shaft and the countershaft and between the countershaft and the third aligned shaft, movable means for separately coupling the driving shaft to either of said aligned shafts, and two pairs of external-internal gears between said third aligned shaft and said driven shaft.

3. In gearing, the combination of a driving shaft, an aligned driven shaft, a third aligned shaft, a countershaft, gearing between the driving shaft and the countershaft and between the countershaft and the third aligned shaft, means for directly coupling the driving shaft to either of said aligned shafts separately, and duplex internal reduction gearing between said third aligned shaft and said driven shaft.

4. In gearing, the combination of a driving shaft, an aligned driven shaft, a third aligned shaft, gearing between the driving shaft and said third aligned shaft, means for directly coupling said driving shaft to either of said aligned shafts separately, and duplex internal reduction gearing between said third aligned shaft and said driven shaft.

5. In gearing, the combination of a driving shaft, an aligned driven shaft, a third aligned shaft, a countershaft, gearing between the driving shaft and the countershaft and between the counter shaft and the third aligned shaft, means for directly coupling either of said aligned shafts to the driving shaft independently of each other, and reduction gearing between the third aligned shaft and the aligned driven shaft.

6. In gearing, the combination of a driving shaft, an aligned driven shaft, a third aligned shaft, a countershaft, gearing between the driving shaft and the countershaft and between the countershaft and the third aligned shaft, means for directly coupling either of said aligned shafts to the driving shaft separately, and constant mesh reduction gearing between the third aligned shaft and the aligned driven shaft.

7. In gearing, the combination of a driving shaft, an aligned driven shaft, a third aligned shaft, a countershaft, gearing between the driving shaft and the countershaft and between the countershaft and the third aligned shaft, means for directly coupling either of said aligned shafts to the driving shaft independently of each other, and gearing between the third aligned shaft and the aligned driven shaft.

8. In gearing, the combination of aligned driving and driven shafts, a third shaft of uniform diameter, said shaft having splines extending the entire length thereof mounted to rotate upon the driven shaft, a clutch element upon one of said aligned shafts and arranged between the other aligned shaft and said third shaft, and a shiftable clutch element rotationally rigid with the other shaft and adapted to co-operate with either the first said clutch element or the splines of the third shaft to clutch the one shaft to either the other aligned shaft or said third shaft, whereby power may be selectively transmitted from the driving shaft to either of the other shafts.

9. In gearing, the combination of a rotatable shaft, a gear mounted to rotate on said shaft, a sliding gear mounted upon said rotatable gear, an internal gear keyed to said shaft, and a rotatably mounted gear element having internal gear teeth adapted to mesh with the rotatable gear on said shaft and having external gear teeth adapted to mesh with the internal gear which is keyed to said shaft, and a drive gear adapted to be engaged by the sliding gear.

10. In gearing, the combination of a support, driving and driven aligned shafts mounted in bearings in said support, a third shaft having splines its entire length mounted to rotate on said driven shaft, a countershaft rotatably mounted on said support, constant mesh gearing connecting the driving shaft with said countershaft, a sliding gear on the splines of said third shaft adapted to make a geared connection with said countershaft, and duplex internal reduction gearing between said third shaft and said driven shaft.

11. In combination, a driving shaft, a driven shaft, and means for connecting said shafts comprising gearing fixed at one end to the driven shaft, a sliding clutch rotatably fixed to the driving shaft, and an intermediate gear element having external teeth throughout its length, said teeth at one end being adapted to drive said gearing fixed to the driven shaft, said teeth at the other end adapted to be positively engaged by said clutch element, and a sliding gear supported on the intermediate portion of said teeth.

12. In gearing, the combination of a driving shaft, an aligned driven shaft, and a third shaft rotatably mounted on the driven shaft having splines its entire length, a clutch member for connecting the driving and third shafts adapted to engage the splines on the third shaft at one end, reduction gearing between the third and driven shafts engaging the splines of the third shaft at the other end, a slidable gear mounted on the splines of the third shaft intermediate the two ends, and a lay shaft operatively connected with the driving shaft and having a gear adapted to be engaged by the slidable gear on the third shaft.

13. In gearing, the combination of a driving shaft, an aligned driven shaft, and a third shaft of uniform diameter rotatably mounted on the driven shaft and having splines its entire length, a clutch member for connecting the driving and third shafts adapted to engage the splines on the third shaft at one end, a compound internal external gear rotatable on an axis offset from the aligned shaft internally engaging the splines of the third shaft at the other end, a second compound internal external gear drivably engaging the first compound gear and fixed to the driven shaft, a slidable gear mounted on the splines of the third shaft intermediate the ends, and a lay shaft operatively connected with the driving shaft and having a gear adapted to be engaged by the slidable gear on the third shaft.

14. In gearing, the combination of a driving shaft, an aligned driven shaft, and a third shaft of uniform diameter rotatably mounted on the driven shaft and having splines its entire length, clutch mechanism for selectively connecting the driving shaft with either the driven shaft or the third shaft by engaging the splines at one end, reduction gearing between the third shaft and driven shaft engaging the splines on the third shaft at the other end, a counter shaft drivably connected with the driving shaft having one gear adjacent the end of the third shaft and a second gear spaced from the first gear, a second lay shaft having a gear in constant mesh with the second gear on the first lay shaft, and a sliding gear on the splines of the third shaft adapted to be selectively moved into engagement with either the first gear on the lay shaft or the gear on the second lay shaft.

15. In gearing, the combination of a driving shaft having splines, an aligned driven shaft, a third shaft rotatably mounted on the driven shaft and having splines extending its entire length, reduction gearing between the third and driven shafts engaging one end of the splines on the third shaft, a sliding clutch on the splines of the driving shaft adapted to be moved into engagement with the other end of the splines on the third shaft, a gear slidably mounted on the splines of the third shaft intermediate the ends, a lay shaft having one gear engaging the splines on the driving shaft and a second gear positioned adjacent the clutch end of the third shaft, said slidably mounted gear on the third shaft being adapted to be moved into engagement with the second gear on the lay shaft only when the clutch element is out of engagement with the splines of the third shaft and said clutch being movable into engagement with the splines only when the sliding gear is out of engagement with the second gear on the lay shaft.

16. In gearing, the combination of aligned driving and driven shafts, a third shaft rotatably mounted on the driven shaft, reduction gearing between the third shaft and driven shaft, a counter shaft, gearing between the driving shaft and counter shaft, a second gear on the counter shaft, and a gear on the third shaft rotatably rigid therewith but slidable into engagement with the second gear on the counter shaft.

17. In a motor vehicle, the combination of a supporting casing, a shaft mounted in bearings therein, an aligned shaft supported at one end in a bearing in said casing and at the other end in a bearing in the first said shaft, a shaft of uniform diameter mounted in bearings on said aligned shaft having splines extending its entire length, means adapted to directly connect the first named shaft with either the aligned shaft or the shaft mounted on the aligned shaft, and internal gearing directly engaging the splines on the shaft of uniform diameter for operatively connecting the same with the aligned shaft so that power may be transmitted from the driving shaft to the aligned shaft either directly or through the shaft of uniform diameter.

18. In a motor vehicle, the combination of a supporting casing, a shaft mounted in bearings therein, an aligned shaft supported at one end in a bearing in said casing and at the other end in a bearing in said first named shaft, a shaft of uniform diameter mounted in bearings on said aligned shaft and having splines, an internal external gear drivingly associated with the splines and mounted on a fixed axis offset from the axis of said shaft, a second internal external gear fixed to said aligned shaft and drivingly associated with the first named internal external gear, and means for drivably connecting the first named shaft with the shaft rotatably mounted on the aligned shaft.

19. In a motor vehicle, the combination of a supporting casing, a shaft mounted in bearings therein, an aligned shaft supported at one end in a bearing in said casing and at the other end in a bearing in the first said shaft, a shaft of uniform diameter mounted in bearings on said aligned shaft having external splines, an internal external gear drivingly associated with said splines and mounted on a fixed axis offset from the axis of said shaft, a second internal external gear fixed to said aligned shaft and drivingly associated with said first named internal external gear, and means adapted to connect the first named shaft with either the aligned shaft or the shaft mounted on the aligned shaft for the transmission of power from the first named shaft through either of the other shafts.

20. In gearing, the combination of aligned driving and driven shafts, a third shaft of uniform diameter, said shaft having splines extending the entire length thereof mounted to rotate upon one of said aligned shafts, a clutch element upon one of said aligned shafts and arranged between the other aligned shaft and the third shaft, and a shiftable clutch element rotatably rigid with the other shaft and adapted to cooperate with either the first said clutch element or the splines on the third shaft to clutch the one shaft to either the other aligned shaft or the third shaft, and reduction gearing between said third shaft and the driven shaft engaging the splines on the third shaft at the other end from the shiftable clutch.

21. In gearing, the combination of aligned driving and driven shafts, a third shaft of uniform diameter, said shaft having splines extending the entire length thereof mounted to rotate upon one of said aligned shafts, a clutch element upon one of said aligned shafts and arranged between the other aligned shaft and said third shaft, and a shiftable clutch element rotatably rigid with the other shaft and adapted to cooperate with either the first said clutch element or the splines of the third shaft to clutch the one shaft to either the other aligned shaft or said third shaft, an internal external gear engaging the splines on the third shaft adapted to rotate about an axis offset from the axis of the aligned shafts, and a second internal external gear fixed to the driven shaft and engaging the first named internal external gear.

In testimony whereof I affix my signature.
ALFRED MOORHOUSE.